United States Patent [19]

Veale

[11] 4,423,599

[45] Jan. 3, 1984

[54] SOLAR ENERGY UTILIZATION APPARATUS AND METHOD

[76] Inventor: Charles C. Veale, 170 McKnight Dr., Laguna Beach, Calif. 92651

[21] Appl. No.: 174,416

[22] Filed: Aug. 1, 1980

[51] Int. Cl.³ .............................................. F03G 7/02
[52] U.S. Cl. ................................. 60/641.8; 126/419; 60/670; 60/671
[58] Field of Search .......................... 60/641.8–641.15; 126/419, 433, 434

[56] References Cited

U.S. PATENT DOCUMENTS

| | | | |
|---|---|---|---|
| 1,002,768 | 9/1911 | Shuman | 60/641.15 |
| 1,853,480 | 4/1932 | Wheeler | 126/434 |
| 2,968,916 | 1/1961 | Taylor et al. | 60/641.8 |
| 3,965,683 | 6/1976 | Dix | 60/641.15 |
| 4,002,031 | 1/1977 | Bell | 60/641.15 |
| 4,094,146 | 6/1978 | Schweitzer | 60/641.14 |
| 4,204,407 | 5/1980 | Smith | 60/641.8 |

*Primary Examiner*—Allen M. Ostrager
*Attorney, Agent, or Firm*—Grover A. Frater

[57] ABSTRACT

A system is provided in which a metered amount of water is converted to steam in a solar collector which employs an elongated convex lens to concentrate solar radiation on an elongated flow tube. The stream is supplied to a concentric rotor turbine whose rotor includes driving portions which rotate in response to steam pressure on one axis and which includes a driven output element that rotates on a different axis.

20 Claims, 6 Drawing Figures

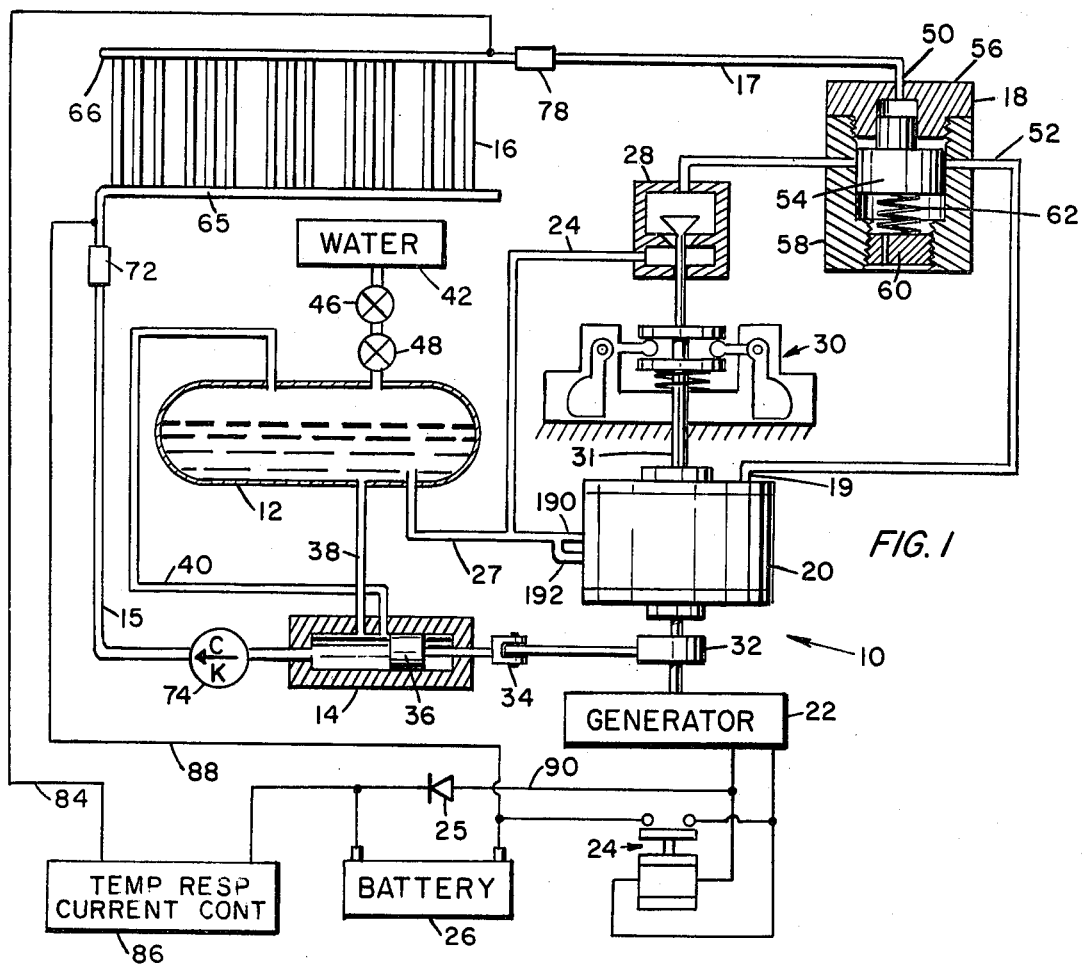
FIG. 1
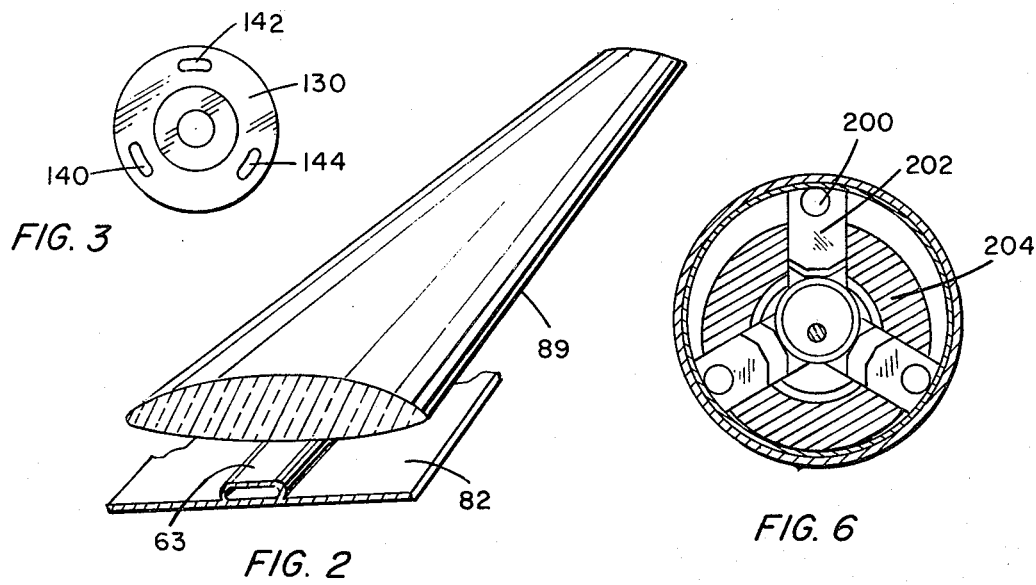
FIG. 3
FIG. 2
FIG. 6

SOLAR ENERGY UTILIZATION APPARATUS AND METHOD

TECHNICAL FIELD

This invention relates to a system in which solar energy is employed to boil a liquid to form a pressured gas the energy in which is converted to electrical energy in a special turbine and to the apparatus of the system and to the method by which the system operates.

BACKGROUND OF THE INVENTION

It is well known to employ the sun's radiations to heat water and to utilize the heated water in a variety of ways. Most of the existing solar energy systems require the use of supplemental energy to circulate water through the system or for control or other purposes. A major limitation has been inability to reach temperatures that are sufficiently high to permit efficient conversion for heat to other energy forms. Even in those instances where high temperatures are reached, a lack of adequate energy transfer apparatus has precluded achieving the degree of efficiency that is required for commercial success.

Even in the southwestern United States, at Phoenix and at Los Angeles, the amount of solar heat reaching the earth on an average summer day is only about 2700 BUT's per square foot. In the District of Columbia the corresponding number is about 2000 BTU's. In the winter months those numbers become about 1100 and 550, respectively. Solar collectors and heat engines of various kinds have been known for a long time, but a non-photo electric system, and system elements, that can be made to generate relatively large quantities of electrical energy automatically from solar energy, under such widely divergent conditions, without the addition of supplemental power has not been available.

SUMMARY OF THE INVENTION

It is an object of this invention to provide efficient and practical system elements, and a system employing them for the generation of electricity, using solar heating as the energy source.

Another object is to provide such a system in which solar energy is employed to convert water or other liquid to gas under pressure and then to expand that gas to operate a heat engine such as a gas or steam turbine.

A further object is to provide an improved gas powered turbine for use in solar energy conversion systems.

A further object is to provide an improved solar collector for use in converting a flow of water to a flow of steam.

These and other objects and advantages of the invention, which will hereinafter become apparent, result, in part, from the combination in a closed flow system of a means for storing liquid, a solar energy collector capable of converting liquid to pressurized gas, a heat engine, a metering means for transferring liquid from the storage means to the solar energy collector at a rate determined by heat engine output speed and for transferring gas from the collector to the engine only when the gas has at least a selected pressure prior to engine start-up and has at least a given pressure while the engine is running.

The solar collector of the invention utilizes an elongated lens to concentrate solar energy on an elongated flow tube.

The heat engine has the form of a concentric rotor turbine portions of whose rotor rotate about one axis while other portions of the rotor rotate on a different axis.

DESCRIPTION OF THE DRAWINGS

In the drawings:

FIG. 1 is a view, partly diagramatic and partly schematic, of a system in which, and in whose apparatus, the invention resides;

FIG. 2 is an isometric view of a portion of the solar collector of FIG. 1;

FIG. 3 is a view in front elevation of a rotating portion of a rotary slide valve that is employed in the steam turbine of FIG. 1;

FIG. 6 is a schematic showing of an alternative form of turbine rotor in a view that corresponds generally to FIG. 5.

DETAILED DESCRIPTION OF THE PREFERRED EMBODIMENT

Figure 4:
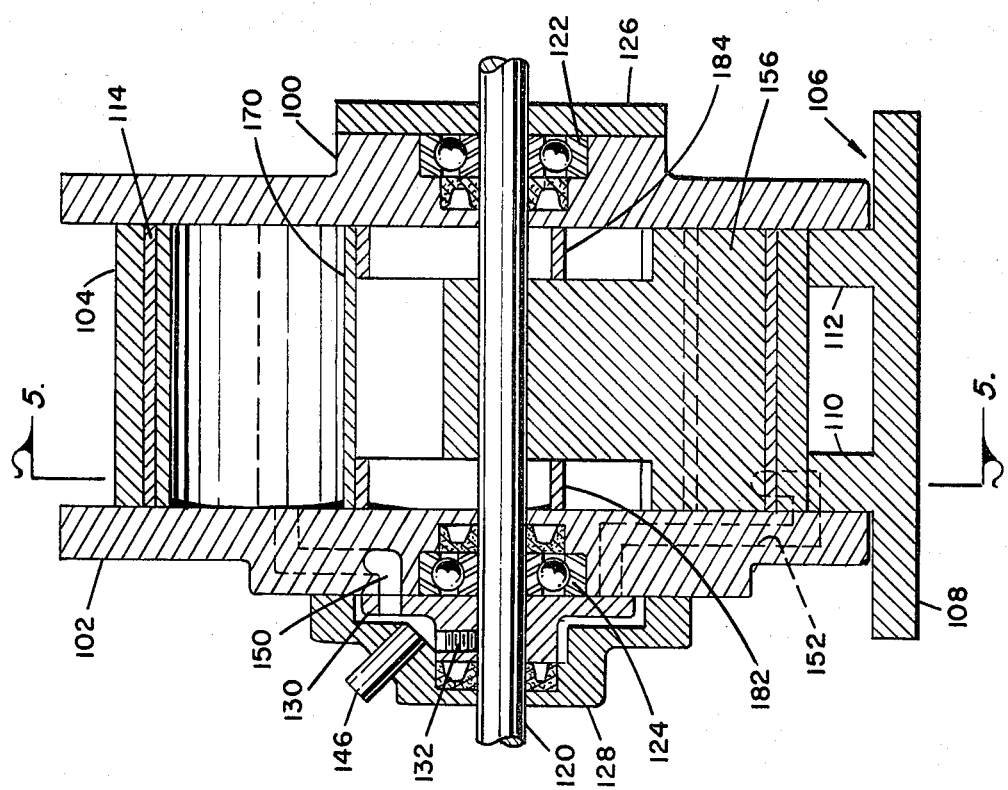
FIG. 4 is a cross-sectional view of the steam turbine of FIG. 1 taken on a plane that extends vertically through the center of the turbine and which contains its axis.

The preferred form of the invention utilizes water, and in FIG. 1, the numeral 10 represents the system generally. It includes a means in the form of a sealed container 12 for providing a supply of clean distilled, deionized water for the system. A means 14 is provided for forcing a metered amount of the water via line 15 from container 12 into a solar energy collection apparatus 16 whose function is to convert solar energy into water sufficiently hot to generate steam. Steam from the energy collection apparatus 16 flows by line 17 through a means 18 by which it is ensured that only steam is delivered to inlet 19 of the solar engine 20. In this preferred form, the engine 20 is a steam turbine. The turbine operates an electrical generating means 22 which supplies its energy through a controller 24 and a rectifier 25 to a storage battery 26.

The spent steam is returned from the solar energy back to the sealed container 12 by line 27. In the case of this preferred embodiment a special means is provided for ensuring that the solar engine will start whatever the position its rotor occupies, and that means includes a bypass valve 28 which is opened and closed by a governor mechanism 30. Valve 28 is included in a line 24 which extends from the outlet side of the valve 18 to the outlet line 27. The governor is driven by the output shaft 31 of the solar engine, and it operates to close the bypass valve 28 after the engine has started.

The function of the metering apparatus 14 is to supply water to the solar energy converter 16 at a rate that varies with solar engine speed. In this preferred embodiment the means 14 comprises a positive displacement metering valve which is operated by an adjustable eccentric mechanism driven from the solar energy engine shaft. That eccentric mechanism includes an eccentric cam which is not visible because of being hidden by the cam follower 32, and it includes the clevis connection 34 by which the cam follower 32 is connected to the piston 36. Water flows from container 12 to the metering device 14 by a flow conduit 38. The container 12, being sealed, the pressure within the container is variable. To ensure that the flow through the conduit 38 to the valve is substantially independent of that pressure, the valve chamber of metering device 14 is connected by a second conduit 40 to the ullage space in the container 12. The openings in the metering valve chamber are arranged so that the line 40 is closed before closure of the line 38 to prevent water from being forced back into the container by the metering valve rather than into the solar energy converter 16.

Make-up water is supplied to container 12 from a source 42 to a line 44 that includes two valves numbered 46 and 48, respectively. The valves are arranged in series, and by opening and closing them in sequence make-up water can be added without disturbing the character of the water circulation system as a completely enclosed self-contained system. That the system be completely enclosed and self-contained is important to operation of the overall system as a self-starting, self-stopping electrical generation unit which will operate over a wide range of energy input and internal pressure conditions.

Starting and stopping of the solar energy engine is controlled by the means 18. In this case that means has the form of a pressure sensing valve which has an inlet port 50, an outlet port 52, and a moveable valve element 54 in the form of a piston one part of which has larger diameter than another and which is housed in a valve housing formed of three parts numbered 56, 58 and 60, respectively. The smaller diameter portion of the piston 54 reciprocates in a cavity formed of housing section 56. The larger diameter portion of the piston reciprocates in a larger cavity in section 58. The piston is biased by a spring 62 so that the smaller diameter portion of the piston is disposed in the smaller cavity. The spring is trapped between the piston 54 and the housing element 60 which is threaded into housing section 58. Rotating the housing section 60 changes the compression of the spring 62 and therefor the bias with which motion of the piston is opposed. When the pressure at inlet port 50 is increased that pressure acts on the face of the smaller diameter portion of the piston, forcing it downwardly against the bias of the spring 62. In this embodiment the area of the piston and the bias of the spring is adjusted so that the piston is forced from the smaller chamber when the pressure at the inlet port reaches about 250 lbs per square inch. When the smaller diameter portion of the piston clears its chamber the pressure that is applied at port 50 is applied to a larger diameter of the piston which is then forced downwardly to clear the port 52 and to permit flow of steam from inlet port 50 to the outlet port 52. The bias of the spring 62 and the area of the piston that is acted upon by inlet pressure is such that the piston is permitted to return toward its original position and to interrupt flow from inlet port 50 to outlet port 52 when the pressure at the inlet port has been reduced to about 150 lbs per square inch.

To develop pressures above 250 lbs per square inch, and to maintain those pressures at a value above 150 lbs per square inch, requires that the water in the solar energy converter 16 be converted to steam. To develop enough steam for practical operation of a steam turbine requires the concentration of a large amount of solar radiation into a relatively small area. That is not particularly difficult to do. It can be accomplished with optical lenses and with reflectors, but that fact alone does not solve the problem. A practical system requires that the light gathering be accomplished in a reasonably small area or nearly contiguous areas because the high temperatures and high pressure required for efficient operation require more complex and expensive means for preventing heat loss and for containing that pressure. In the invention the difficulty of gathering radiation sufficient to reach high temperatures, and to generate reasonably large quantities of steam, is solved by the use of elongated lenses which overlie thermally conductive water and steam flow lines. While the lens may have any of a number of configurations, the preferred configuration, in cross-section, is the form called "double convex." Second choice, which is preferred in some applications because of its lower cost, is a plano-convex shape. In either case the lens is elongated. It can be made in curved form to coincide with the sun's path. However, the lens is straight in this embodiment, as best shown in FIG. 2 so that the focal point of each section of the lens along its length results in a locus of focal points that is described by a straight line. The water and steam flow line is disposed so that it contains, or is immediately adjacent to, that locus of focal points. In the preferred form of the invention the water and steam flow line 63 is flat or oval shaped in the sense that it is wider than it is thick. That arrangement provides a broader upper surface for collecting heat by radiation through the lens 64. To make the heat collection water flow path element broad solves focusing problems and reduces the energy loss that normally attends failure to include a provision for orienting the solar collection apparatus in a manner to receive maximum radiation at any time.

The solar collector of the invention includes a number of water and steam flow lines and collector lenses of the kind illustrated in FIG. 2. In the embodiment shown in FIG. 1 the energy conversion device 16 is shown to comprise banks each including six of the units shown in FIG. 2. Each of the water and steam flow paths of those several units extends from a connection at a flow header 65 at the inlet side to a flow header 66 at the outlet side. This embodiment includes no means for reorienting the solar energy collector units to "follow the sun." Certainly, the units shown can be so arranged, but provision for optimizing orientation usually requires the addition of external start-up power, and it is one of the objects of the invention, in connection with its preferred embodiment, to provide a system in which that kind of orientation is unnecessary. Use of the lens arrangement of FIG. 2 helps in making that possible.

Other lens shapes may be employed. In some applications it may be feasible to employ an aspheric lens to minimize aberrations, but the form shown in the drawing is now preferred.

In this system output energy is stored in the storage battery 26 where it is available for use in accomplishing control of the system. Thus, for example, energy from that battery is available to power apparatus for orienting the solar collector to receive maximum energy. Since that is not essential for proper operation of this system the election has been made not to use the energy in that fashion. On the other hand, if the water in the solar collector tubes is permitted to freeze the flow path could be destroyed or, at a minimum, the tubes could be forced out of the flat shape shown to a shape more nearly round because ice occupies a greater volume than does water. In this embodiment the flow path 15 from the metering means 14 to the inlet manifold 65 includes an electrically insulating conducting section 72 at a point downstream from the check valve 74 and adjacent to the manifold. In similar fashion, the outlet flow conductor 17 which extends from the outlet manifold 66 to the pressure control valve 18 and the bypass valve 28 is broken to interrupt electrical continuity along that line, and the path is made continuous by the addition of an insulating section 78. Returning to FIG. 2, the flow conductor 63 is mounted on a non-electrically conductive supporting base 82, and the flow conductor is made of a stainless steel material which exhibits relatively high electrical resistance. An electrical connection 84 is completed through a temperature responsive heating current controller 86, to the manifold 66 and a second electrical conductor 88 is connected from the other terminal of the battery to the manifold 65. When the ambient temperature reaches a value at which there is danger of freezing in the solar collector, the controller causes electricity to flow through the stainless steel solar collector flow elements, heating them sufficiently to prevent freezing. When the danger of freezing is past that circuit is opened by operation of the controller 86. In practice, the water collection tube 63 need have a wall thickness of 10/1000ths of an inch, or even less. Because of being so very thin the use of a material that has less than optimum heat conductivity is entirely permissible. Thus, for example, it is entirely feasible to employ cupro-nickel material in making the water flow pipes. Stainless steel exhibits greater electrical resistance and makes it easier to accomplish heating to prevent frost. However, when that is not a requirement, for units that are to be operated in areas where freezing temperatures are not encountered, the preferred material for the water flow paths is copper. The preferred material for the water flow paths is copper. The preferred material for the lens 89 is glass with a refractive index about 1.5. Some of the plastics have suitable indices of refraction and may be used instead.

Figure 5:
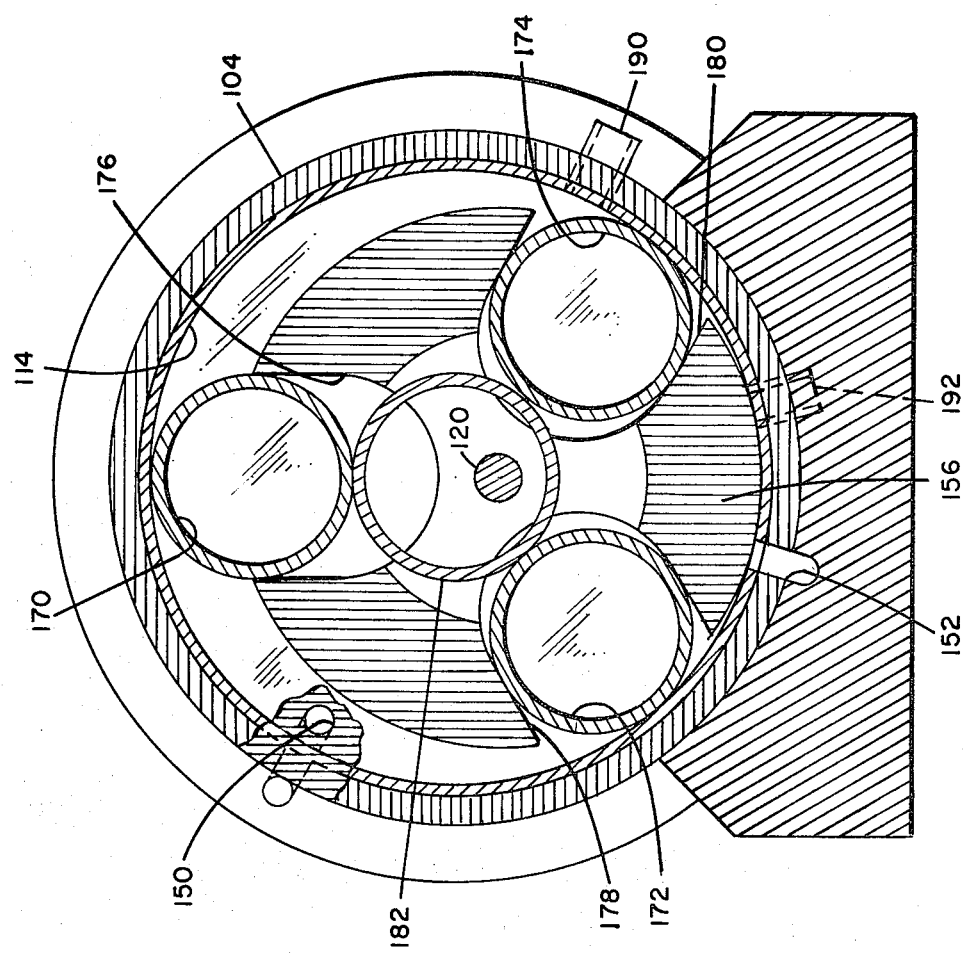
FIG. 5 is a cross-sectional view taken on line 5—5 of FIG. 4.

It is not essential for successful practice of the invention that the solar engine be a turbine. Nonetheless, that form is greatly preferred because of the form of load that it presents to the solar collector and to the valve 18. Not only is the turbine preferred, but the particular form of turbine illustrated in FIGS. 3, 4 and 5 is preferred because its features are easily integrated into the overall system. The turbine falls into the "offset rotor" class of energy converters, and like many of the members of that class is suitable both as a turbine or fluid motor and as a fluid pump. The unit includes a housing the elements of which define a cylindrical cavity in which a rotor is disposed. In FIGS. 4 and 5 the housing is shown to comprise four components. One is a generally circular rear end plate 100, another is a generally circular forward end plate 102. A cylindrical spacer section 104 is clamped between the two end plates so that its central axis lies on the axis of the two end plates. The housing is completed by a base 106 which comprises a flat lower plate 108 and a pair of upstanding projections 110 and 112, respectively, by which the base member is fixed to the two end members 100 and 102.

To form a smooth inner bore for operation of the rotor, the housing is provided with a liner 114 in the form of a cylinder which is press fitted into the encompassing spacer 104. The rotor is fixed to the shaft 120 which extends through the rotor and the end plates 100 and 102, and which is supported by ball bearing sets that are in turn supported by the end plates. Bearing set 122 carries the shaft at the rear end plate, and bearing 124 carries the shaft at the forward end plate. A cover plate 126 protects the bearing at the rear plate, and a cover plate 128 protects the bearing and the rotating part 130 of a rotating slide valve at the forward end plate. The rotating element 130 is fixed to the shaft 120 by a set screw 132 in a central hub, or other convenient means, so that it rotates with the shaft. Except for its central hub, the rotating element 130 has the form of a flat disc in which three flow openings are formed. Those openings are numbered 140, 142 and 144 for identification. They are uniformly spaced 120 degrees apart as best shown in FIG. 3, and they are elongated so that flow can proceed through them over a few degrees of rotation. Those three openings afford communication between a steam inlet fitting 146 which can be seen in FIG. 4 and two inlet passages by which steam is permitted to flow through openings 140, 142 and 144, two at a time, into the rotor cavity.

Steam flows into the turbine at fitting 146 and into the space between the end cap 128 and the valve rotor 130. In that space the steam is free to flow to all three of the rotor openings 140, 142 and 144. That rotor has a sliding fit against the forward face of the central region of the forward end plate 102. As they rotate, they pass entry openings to two passageways one of which is partly visible in FIG. 4 where it is identified by the reference numeral 150. The remainder of that passageway lies out of the cross-sectional plane but its position has been indicated with a dotted line. To illustrate the position at which it opens into the rotor cavity, the section line for FIG. 5 has been taken along a meandering line at the point of passageway entry. As a consequence, the end of that passageway 150, near where it opens into the rotor cavity, is shown in FIG. 5 where it is identified by reference numeral 150.

Steam may also enter the rotor cavity through a second passageway 152 whose position is indicated in FIG. 4 with dotted lines and a portion of which is visible in the cross-sectional view of FIG. 5. Flow can proceed from the inlet fitting 146 through the space between the end housing 128 and the rotor portion of the slide valve 130, and through one of the openings 140, 142 and 144 when it is positioned opposite the entrance to passageway 152. Flowing through passageway 152 it enters into the cavity through the liner 114. Thus, passageway 152 opens at the outer periphery of the rotor cavity unlike the passageway 150 which opens at the side of the cavity through the forward end plate. The reason for that will be apparent when the size and shape of the rotor is explained. There simply is not enough room, as suggested in FIG. 5, between the rotor and the liner 114 to permit introducing steam through the end plate, although examination of FIG. 5 will show that that is entirely possible in the case of passageway 150. It is entirely acceptable, and in some embodiments might be preferable, that the passageway 150 open at the outer circumference of the rotor cavity rather than at the side wall.

In addition to the shaft 120, the rotor comprises several elements including three hollow cylinders identified by the reference numerals 170, 172 and 174, respectively. These three cylinders are arranged with their axes parallel to one another and to the axis of the shaft 120. They extend from one end plate to the other and have dimensions so that they can slide freely over the inner surfaces of the two end plates within the rotor cavity as they are forced by expanding steam to rotate around the cavity driving the rotor output drive element 156. The drive element is fixed to shaft 120 so that it rotates with the shaft. It is formed with three outwardly extending slots spaced 120 degrees apart in FIG. 5 where they are visible and are numbered 176, 178 and 180. Each of those three slots is sufficiently wide, as best shown in FIG. 5, to receive their respectively associated one of the three cylindrical members. Cylinder 170 is disposed in slot 176. Cylinder 172 is disposed in slot 178. Cylinder 174 is disposed in slot 180. Each of those slots is sufficiently deep so that its respectively associated sleeve is free to move relative to the drive rotor in a radial direction from the center of the drive rotor and the axis of the drive shaft 120.

The three cylinders 170, 172 and 174 are continually urged into engagement with the cavity liner 114 by a central ring 182 which has diameter to engage all three of the cylinders and which has size to force all three into continuous engagement with the liner. While not apparent in either FIG. 4 or FIG. 5 because the degree is so slight the ring 182 at the forward side of the unit, and its counterpart 184 at the rearward side, are made of a resilient material and have a size such that they must be deformed slightly to be assembled between the three cylinders as they are shown to be in the drawings. The rings 182 and 184 are deformed less than their elastic limit, and they simply serve as springs which act to force the cylinders into engagement with the inner surface of liner 114. Because the rotor drive element 156 is eccentrically mounted there is a relative movement between the cylinders and the drive rotor notwithstanding that the cylinders do not deviate from their circular path of motion, and the fact that the drive rotor does not deviate from its circular path of rotation.

While the three valve openings 140, 142 and 144 in the valve slide 130 are uniformly spaced 120 degrees apart, like the three cylinders 170, 172 and 174, the point at which openings 150 and 152 open at the forward face of the end member 102 is somewhat less than 120 degrees of rotation apart. Since the passageways 150 and 152 extend radially through the end plates, the angular separation between them is illustrated in FIG. 5 by the position of the outlet of those passageways. The rotory portion of the slide valve is fixed to the shaft relative to the angular position at which the rotor drive element 156 is fixed to that shaft such that communication through passageway 152 comes to an end when the rotor has the rotational position illustrated and so that communication is just beginning to be afforded through the passageway 150. That applies, and it is correct, that rotation is in the clockwise direction in FIG. 5.

Steam begins entering through the passageway 152 just after a cylinder of the rotor has moved past the outlet opening of the passage, and it continues until the rotor has rotated about 20 degrees. During that interval, the steam that has entered into the space between the rotor and the turbine lining expands. As it does so, it presses against the cylinder. Since the latter is prevented from moving inwardly in its rotor drive slot by rings 182 and 184, and since those rings force the cylinder against the liner sufficiently to prevent escape of steam past the cylinder, the whole rotor is driven to rotation. When it passes the outlet of inlet passage 150 an additional quantity of steam enters the now enlarged space between rotor and the liner where it expands to add to the force that results in rotor rotation.

Steam is exhausted through two outlet openings that are formed in the outer periphery of the rotor cavity. That is, they are formed through the wall of the liner 114 and the spacer cylinder 104 to fittings by which they are connected one to the other and to the return line by which the exhausted steam is returned to vessel 12 of FIG. 1. The two outlets are spaced so that most of the steam is exhausted at the outlet 190 and so that any steam that remains in the space between the rotor and the liner will be forced out at outlet 192 after the cylinder that forces the exhaust has passed the position of outlet 190.

Returning to FIG. 1, the bypass valve 28 and governor type actuator 30 are ordinarily not required. The use of two inlet passageways for steam precludes stopping the rotor at a position at which no valve is open. However, that requires relatively long valve opening times which wastes some steam. For the extreme case it is preferred to reduce inlet valve opening times and to provide another means for ensuring start-up regardless of rotor position. In this case the bypass valve will apply steam to the outlet ports to provide a slight rotation that might be required to move the slide valve rotator to permit inlet flow.

The generator 22 is driven by the output or rotor shaft of turbine 20. To ensure that current cannot flow from the battery to the generator when the system is at rest, a rectifier 25 is included in line 90 between the generator and the battery. To avoid any leakage flow through the rectifier it is preferred to include the relay 24 whose contacts open and close one of the lines to the battery in response to change in the voltage applied to the relay coil. The coil and battery are connected in parallel and the contacts are closed only when there is an output from the generator.

An alternative rotor construction is illustrated in FIG. 6. It differs in that the cylindrical tubes 170, 172 and 174 have been replaced with solid, smaller diameter cylinders mounted in a rectangular carrier. Except that the slots in the rotational drive section of the rotor have been reshaped to better accommodate the rectangular carriers, the remainder of the structure is unchanged. For identification, one of the replacement rollers is identified with the reference numeral 200 and its carrier is numbered 202. The modified rotational drive rotor is numbered 204.

Although I have shown and described certain specific embodiments of my invention, I am fully aware that many modifications thereof are possible. My invention, therefore, is not to be restricted except insofar as is necessitated by the prior art.

I claim:

1. A solar to mechanical energy conversion system comprising, in combination:
   means in the form of a solar energy collector for converting an inlet stream of water to an outlet flow of steam;
   control means for preventing initiation of water and steam flow at steam pressure below a selected pressure and after initiation of water and steam flow, for terminating water and steam flow at pressures less than a given pressure; and
   heat engine means responsive to said flow of steam above the selected pressure for generating a mechanical energy output.

2. The invention defined in claim 1 which further comprises means for altering the volumetric rate of flow in said inlet stream of water in proportion to the mechanical energy output.

3. The invention defined in claim 1 in which said heat engine means comprises a steam turbine whose output is a shaft rotation and which further comprises means for altering the volumetric flow rate of said inlet stream of water in proportion to the rate of said shaft rotation output.

4. The invention defined in claim 1 in which said control means comprises a valve having an actuator responsive to pressure applied to an area thereof and having a means for applying pressure to a greater area of the actuator when the valve is opened than when closed.

5. The invention defined in claim 2 in which said means for altering volumetric rate of flow comprises a positive displacement pump.

6. The invention defined in claim 5 in which said system includes a check means for preventing reverse flow of said inlet stream and which includes a sealed water container said pump being included in said inlet stream intermediate said container and the check means, means in the form of two flow paths between the pump chamber and respectively associated spaced points in the container, one below and one above the liquid level, for ensuring flow of said inlet stream into the pump at any container pressure.

7. The invention defined in claim 6 in which said control means comprises a valve having an actuator responsive to pressure applied to an area thereof and having a means for applying pressure to a greater area of the actuator when the valve is opened than when closed.

8. The invention defined in claim 7 in which the flow path for water and steam extends from said container to said check means to said solar energy collector to said control means to said heat engine means and from said heat engine means back to said container, said flow path being sealed from ambient atmosphere throughout its length.

9. The invention defined in claim 1 in which said solar energy collector comprises a plurality of flow tubes and means in the form of lenses for collecting solar radiation and directing it toward said flow tubes.

10. The invention defined in claim 9 in which said lens is elongated to extend over a length of a flow tube, has a convex shape in cross-section such that the locus of focal points forms a line and in which the flow tube is positioned at said line.

11. The invention defined in claim 1 in which said heat engine means comprises a turbine housing which defines a cavity that is symmetrical about a central axis;
an output shaft extending through said cavity on an axis parallel to but spaced from said central axis;
a rotor disposed in said cavity and comprising a drive element fixed to said shaft and rotatable to rotate said shaft and further comprising driving means rotatable about said central axis for dividing said cavity, with said drive element, into a plurality of chambers, which chambers rotate with said driving means, and for forcing rotation of said drive element; and
steam flow control means for introducing said flow of steam into said chambers at selected rotational positions.

12. The invention defined in claim 11 in which said flow control means comprises a steam flow path opening into said cavity at at least one fixed point and valve means responsive to the angular position of said output shaft for closing said steam flow path except when the output shaft has an angular position within a predefined range of angular positions.

13. The invention defined in claim 11 in which said cavity is cylindrical and in which said driving means comprises a plurality of driving cylinders uniformly spaced one from the next around the inner periphery of said cavity, said driving cylinders being coupled to said drive element such that relative motion between the driving cylinders and drive element is substantially precluded in the direction of their rotational movement whereas relative motion between the driving cylinders and drive element in the axial direction occurs as an incident to their rotation motion.

14. The invention defined in claim 13 in which said rotor further comprises spring means in the form of a spring through which said output shaft extends and which engages each of said driving cylinders for forcing said cylinders into engagement with the inner periphery of said cavity whatever the rotational position of said driving cylinders.

15. The invention defined in claim 14 which comprises at least driving cylinders and in which said spring is cylindrical and has its axis parallel with the axes of said driving cylinders.

16. The method of converting solar radiant energy into electrical energy which method comprises the steps of providing a closed flow path from a water container through a metering pump and a check valve and a solar energy collector and a pressure actuated valve which opens at a selected pressure and closes at a given lower pressure, and a heat engine, back to said container in series in that order;
subjecting the solar collector to solar radiation concentrated sufficiently to cause a conversion of water to steam in said collector;
operating said metering meter to cause a flow of water from said container to said heat exchanger which is proportional in magnitude to the speed at which the heat engine is operated; and
converting the output of the heat engine to electrical energy.

17. A solar to mechanical energy conversion system comprising, in combination:
means in the form of a solar energy collector for converting an inlet stream of liquid to an outlet flow of gas;
control means for preventing initiation of liquid and gas flow at gas pressure below a selected pressure and after initiation of liquid and gas flow, for terminating liquid and gas flow at pressures less than a given pressure; and
heat engine means responsive to said flow of gas above the selected pressure for generating a mechanical energy output.

18. The invention defined in claim 17 which further comprises means for converting the mechanical energy output of said heat engine means to electrical energy and for storing at least a portion of said electrical energy.

19. The invention defined in claim 17 which further comprises means for converting the mechanical energy output of said heat engine means to electrical energy and for storing at least a portion of said electrical energy; and
which further comprises means for utilizing the stored energy to prevent freezing of liquid in said solar energy collector.

20. The invention defined in claim 19 in which said solar energy collector includes an electrically conductive flowpath for the liquid and in which said means for preventing freezing includes causing an electrical current to flow through said electrically conductive flowpath.

* * * * *